US009572362B2

(12) United States Patent
Difante

(10) Patent No.: US 9,572,362 B2
(45) Date of Patent: Feb. 21, 2017

(54) STOCK POT WITH FITTED STRAINER BASKET

(71) Applicant: Agostino Difante, San Clemente, CA (US)

(72) Inventor: Agostino Difante, San Clemente, CA (US)

( * ) Notice: Subject to any disclaimer, the term of this patent is extended or adjusted under 35 U.S.C. 154(b) by 346 days.

(21) Appl. No.: 14/253,624

(22) Filed: Apr. 15, 2014

(65) Prior Publication Data

US 2014/0227415 A1    Aug. 14, 2014

Related U.S. Application Data

(60) Division of application No. 13/373,639, filed on Nov. 22, 2011, now Pat. No. 8,707,859, and a continuation-in-part of application No. 12/932,357, filed on Feb. 25, 2011, now Pat. No. 8,826,806, and a continuation-in-part of application No. 13/200,275, filed on Sep. 22, 2011, now Pat. No. 8,707,860.

(51) Int. Cl.
    *A23L 1/01*      (2006.01)
    *A47J 37/12*     (2006.01)
    *A47J 36/20*     (2006.01)

(52) U.S. Cl.
    CPC ............... *A23L 1/0107* (2013.01); *A23L 5/11* (2016.08); *A23L 5/13* (2016.08); *A47J 36/20* (2013.01); *A47J 37/1266* (2013.01)

(58) Field of Classification Search
    CPC ........... A47J 27/04; A47J 36/20; A47J 36/08; A47J 37/1266; A23L 5/11
    USPC .......... 99/413, 410, 417, 415, 412; 210/469, 210/471, 473, 475, 465; 426/509, 506, 520, 426/523, 438
    See application file for complete search history.

(56) References Cited

U.S. PATENT DOCUMENTS

| | | |
|---|---|---|
| 1,004,423 A | 9/1911 | Hanlon et al. |
| 1,023,645 A | 4/1912 | Hamilton |
| 1,238,688 A | 8/1917 | Kinkel |
| 1,276,749 A * | 8/1918 | George .................. A47J 36/20 99/412 |
| 2,061,533 A | 11/1936 | Anetsberger |
| 2,064,214 A | 12/1936 | Merkle |
| 2,097,478 A * | 11/1937 | Struble .................. A47J 36/20 99/412 |
| 2,132,099 A | 10/1938 | Doering et al. |
| 2,188,563 A | 1/1940 | Anzalone |
| 2,307,408 A | 1/1943 | Kent |
| 2,555,720 A | 6/1951 | Wiegel |
| 2,576,332 A | 11/1951 | Derck |
| 2,588,614 A | 3/1952 | Capra |
| 2,742,849 A | 4/1956 | Stiglitz |
| 2,753,436 A | 7/1956 | Schwaneke |
| 2,760,641 A | 8/1956 | Mies et al. |
| 2,785,277 A | 3/1957 | Jepson |
| 3,508,485 A | 4/1970 | Munsey |
| 3,939,760 A | 2/1976 | Eaton et al. |
| 4,401,017 A | 8/1983 | Feld |
| 4,555,339 A | 11/1985 | Graves et al. |
| 4,574,776 A | 3/1986 | Hidle |
| 4,604,989 A | 8/1986 | Kita |
| 4,626,352 A | 12/1986 | Massey et al. |
| 4,688,549 A | 8/1987 | Blankemeyer et al. |
| 4,714,012 A | 12/1987 | Hernandez |
| 5,221,475 A | 6/1993 | Mealey et al. |
| 5,287,798 A | 2/1994 | Takeda |
| D349,420 S | 8/1994 | Hasuike |
| 5,370,042 A | 12/1994 | Tolchin et al. |
| 5,402,714 A | 4/1995 | Deneault et al. |
| 5,653,881 A | 8/1997 | Bruss et al. |
| 5,662,026 A | 9/1997 | Prakasa |
| 5,730,045 A | 3/1998 | Delaquis et al. |
| 5,826,494 A | 10/1998 | Wang |
| 5,918,535 A | 7/1999 | Moreau |
| 6,055,901 A | 5/2000 | Gantos et al. |
| 6,103,291 A | 8/2000 | Fernandez Tapia |
| 6,269,737 B1 | 8/2001 | Rigney et al. |
| 6,314,869 B1 | 11/2001 | Bourgeois, Jr. |
| 6,446,545 B2 | 9/2002 | Rigney |
| 6,546,849 B1 | 4/2003 | Shimazaki |
| 6,568,314 B1 | 5/2003 | Stepanova |
| 7,021,202 B2 | 4/2006 | Sizer |
| 7,467,718 B1 | 12/2008 | Donohue |
| 7,878,110 B1 | 2/2011 | Michnik et al. |
| D639,109 S | 6/2011 | Molayem |
| D640,896 S | 7/2011 | Molayem |
| D642,421 S | 8/2011 | Difante |
| D646,525 S | 10/2011 | Molayem |

(Continued)

OTHER PUBLICATIONS

Non-Final Office Action dated Jul. 2, 2013 in U.S. Appl. No. 13/200,275.
Non-Final Office Action dated Aug. 12, 2013 in U.S. Appl. No. 13/373,639.
Non-Final Office Action dated May 10, 2013 in U.S. Appl. No. 12/932,357.
Non-Final Office Action dated Sep. 25, 2013 in U.S. Appl. No. 12/932,357.
Non-Final Office Action dated Jan. 3, 2013 in U.S. Appl. No. 12/932,357.
Final Office Action dated Nov. 7, 2013 in U.S. Appl. No. 13/200,275.

*Primary Examiner* — Reginald L Alexander
(74) *Attorney, Agent, or Firm* — Robert D. Buyan; Stout, Uxa & Buyan, LLP

(57) ABSTRACT

Apparatus for cooking foods such as stock or pasta, rice including a container which receives a liquid to be heated and a cooking strainer-basket partially submerged in the liquid for cooking within the container, the container having selectively placed interior generally cylindrical support pins, cooperating with selectively placed alternating outwardly and inwardly extending planar support sections on the strainer-basket for alternatively positioning of the basket in the liquid for cooking of the food and repositioning of the basket above the liquid to provide for straining of the food.

9 Claims, 4 Drawing Sheets

(56) References Cited

U.S. PATENT DOCUMENTS

| | | |
|---|---|---|
| D653,073 S | 1/2012 | Difante |
| D653,074 S | 1/2012 | Difante |
| D658,424 S | 5/2012 | Difante |
| D658,425 S | 5/2012 | Difante |
| D687,256 S | 8/2013 | Difante |
| D687,257 S | 8/2013 | Difante |
| 2004/0216620 A1 | 11/2004 | Quiggins et al. |
| 2004/0238438 A1 | 12/2004 | Chen |
| 2005/0205487 A1 | 9/2005 | Rogers |
| 2006/0254976 A1 | 11/2006 | Cooper |
| 2008/0121117 A1 | 5/2008 | Best |
| 2012/0174798 A1 | 7/2012 | Kulikowski |
| 2012/0216683 A1 | 8/2012 | Difante |
| 2012/0240790 A1 | 9/2012 | Difante |
| 2013/0074702 A1 | 3/2013 | Difante |

\* cited by examiner

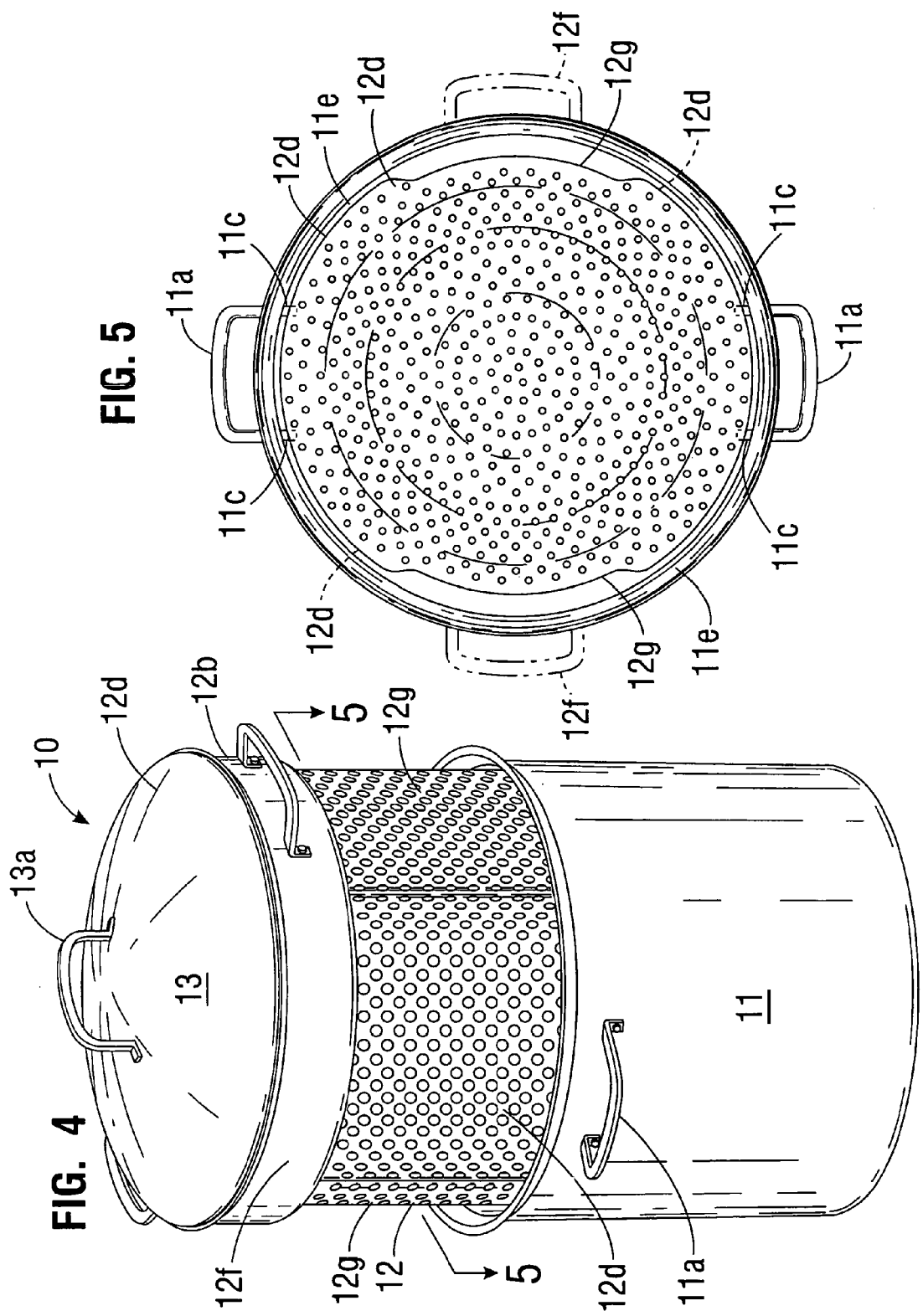

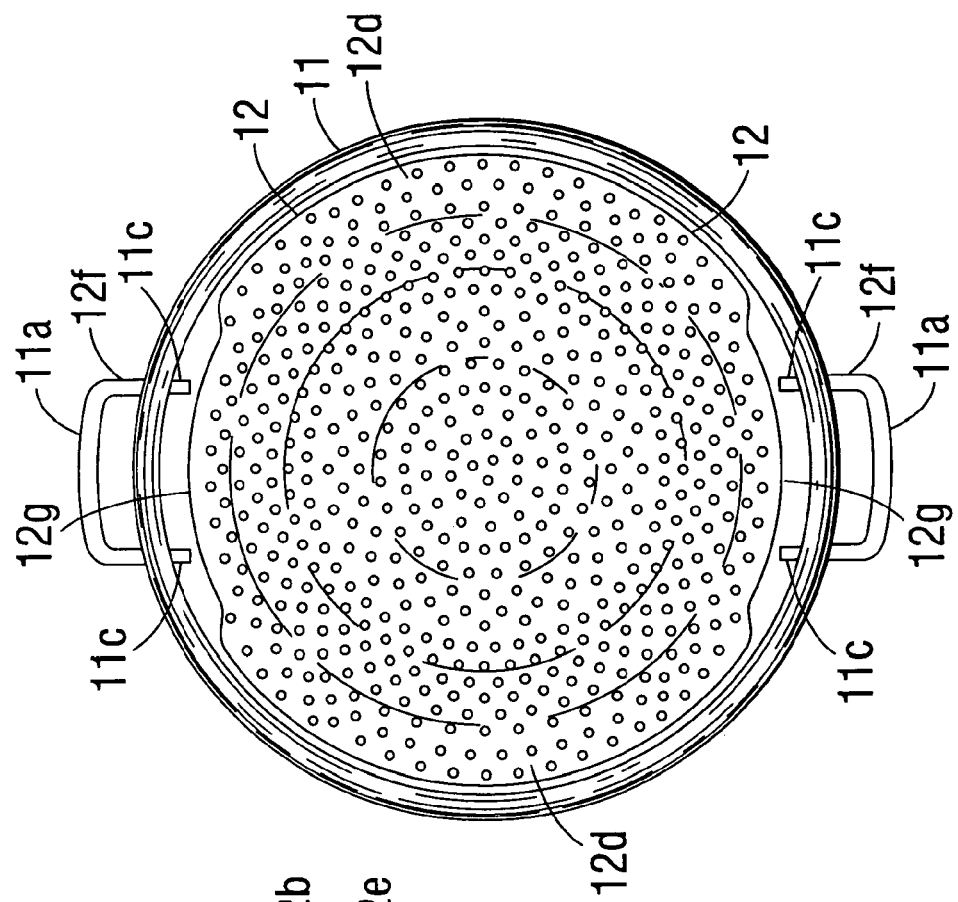
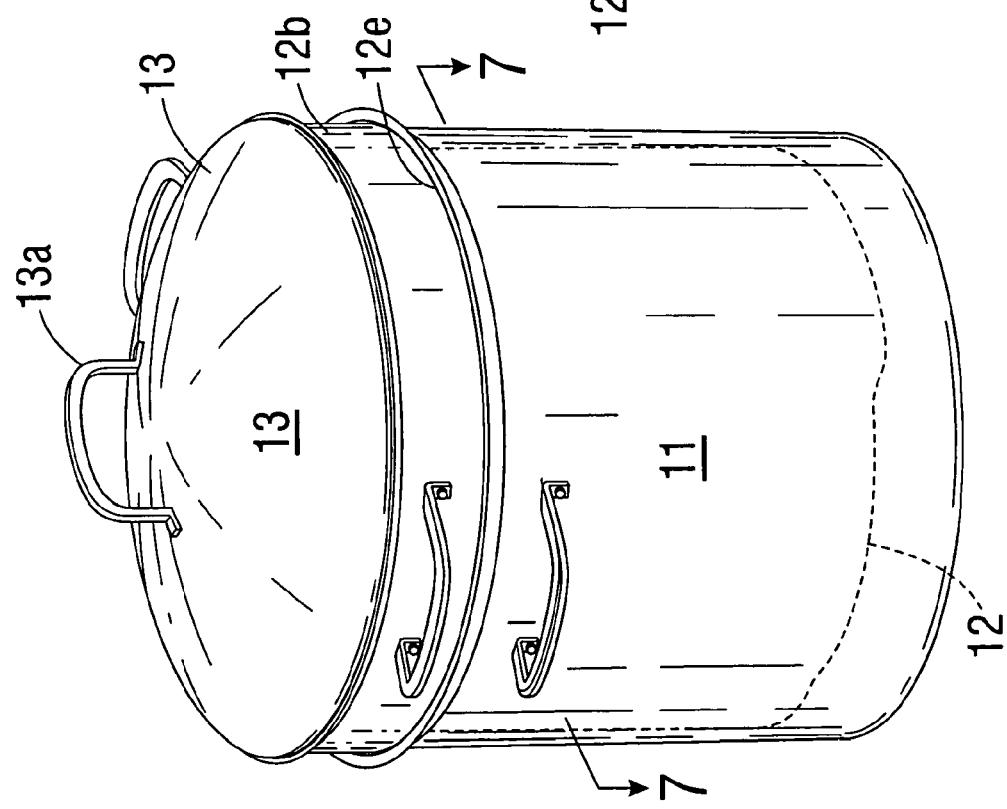

STOCK POT WITH FITTED STRAINER BASKET

RELATED APPLICATIONS

This application is a division of U.S. patent application Ser. No. 13/373,639 filed Nov. 22, 2011 and issuing as U.S. Pat. No. 8,707,859 on Apr. 29, 2014. Additionally, this application is a continuation in part of copending U.S. patent application Ser. No. 12/932,357 filed Feb. 25, 2011. Also, this application is a continuation in part of U.S. patent application Ser. No. 13/200,275 filed Sep. 22, 2011 and issuing as U.S. Pat. No. 8,707,860 on Apr. 29, 2014. The entire disclosure of each of these related applications is expressly incorporated herein by reference.

BACKGROUND

The background of the invention will be discussed in two parts.

Field of Invention

The present invention relates in general apparatus for cooking foods such as stock or pasta and more particularly to a container having liquid to be heated and having selectively placed generally cylindrical support pins, and a fitted cooking strainer-basket specifically shaped with alternating outwardly and inwardly extending circular planar sections for positioning of the strainer-basket within the container for cooking of the food and alternatively repositioning of said basket above container for straining of food.

Prior Art

Apparatus for cooking and/or straining of pasta and the like have become commonplace and a variety of such apparatus are known in the art, however, prior art devices are inefficient, difficult to work with, and unsafe. It is a feature of the present invention to provide a new and improved cooking apparatus for cooking and for straining of food that is more easy to use, more efficient, safer, and more economical than prior art devices. It is another feature of the invention to provide cooking and straining apparatus that does not require removal of the cooking basket from the container for straining of the food. Other objects of the invention will become apparent with reading of the specification taken with the drawings wherein there is shown and described the apparatus of the invention.

SUMMARY

The present invention provides apparatus for cooking stock and or foods such as pasta and includes a container which receives a liquid, such as water, to be heated and a cooking strainer-basket within the container which is submerged in the liquid for cooking. The container having selectively placed outwardly extending generally cylindrical support pins along the interior face of said container, and a fitted cooking basket specifically shaped with alternating outwardly and inwardly extending circular planar sections for alternatively positioning of the basket in the water, oil, or other liquid, for cooking of the food and repositioning of the basket above the water, oil, or other liquid to provide for straining of the food.

DRAWINGS

Figure 1:
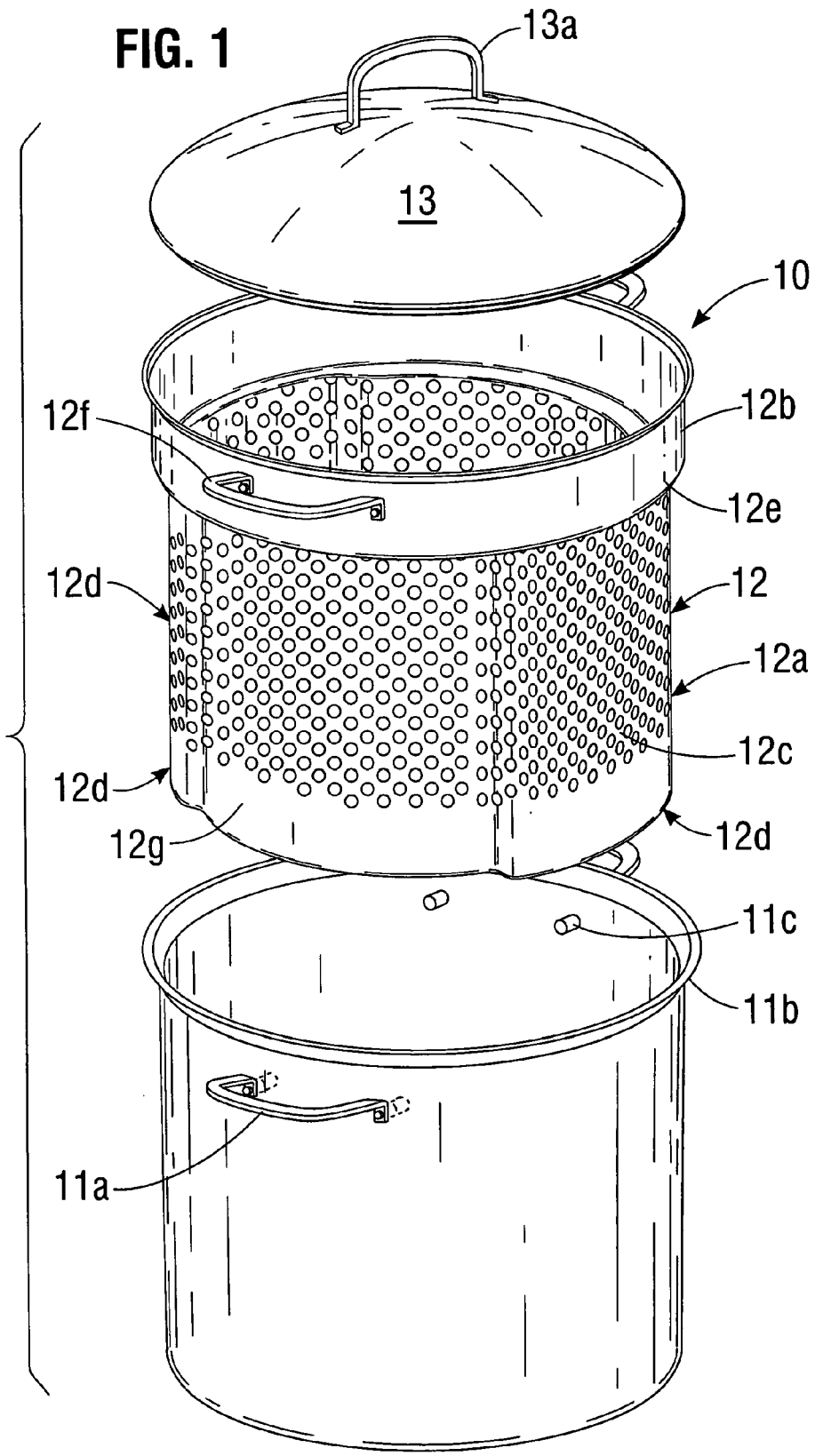
FIG. 1 is an exploded view of the cooking apparatus in accordance with the present invention.
Figure 3:
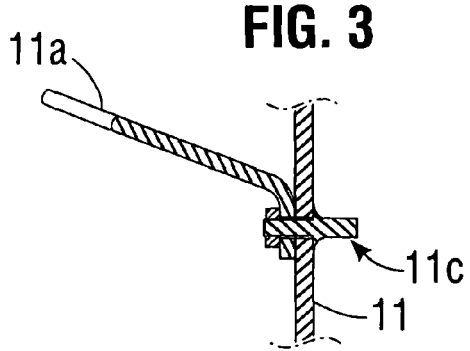

FIG. 3 illustrates in cross-sectional view one configuration of the support pins and the handle of the container FIG. 4 illustrates the strainer-basket of FIG. 1 positioned above the cooking liquid with the container pins and the alternating outwardly and inwardly extending circular planar sections of the strainer-basket rotated so that the outward section is aligned over the support pins to engage and support said basket above liquid for straining of the food.

FIG. 5 is a top view showing the positioning of the outwardly extending circular planar section of the strainer-basket rotated and aligned over the support pins (shown dotted below) to engage the container support pins, allowing for the strainer-basket to be raised and supported at the food straining position within the container;

FIG. 6 illustrates the apparatus of the invention with the container support pins, and the inwardly extending circular planar section of the strainer basket rotated and aligned with container support pins allowing for the strainer-basket to clear the support pins and to be fully inserted into the container and ready for storage or cooking; and transport.

FIG. 7 is a top view showing the positioning of the inwardly extending circular planar section of the strainer-basket rotated to clear the container support pins allowing for insertion of basket into container for cooking of food.

DESCRIPTION

Referring now to the drawings in general, and particularly to FIG. 1, there is shown in exploded view, the stock pot cooking apparatus of the invention, generally designated 10. The cooking apparatus 10 includes a circular water container 11, a circular cooking strainer-basket generally designated 12, having a lower portion 12a with a general diameter less than the inside diameter of container 11 for fitting within container 11, and an upper circumferential portion 12b with a diameter greater than the outside diameter of container 11 and configured with a shoulder-like projection extending outwardly from the top of container 11 to restrain insertion of strainer-basket 12 into container 11, and lid 13 for fitting over the upper portion 12b of strainer-basket 12. Container 11 includes two side handles 11a (one shown), for smaller stock pots only one handle may be needed, a continuous outwardly extending top lip 11b, and interior selectively positioned support pins 11c. Generally cylindrical pins 11c are selectively spaced intermittently around the interior of the container 11, are generally pin like and extend generally perpendicularly inwardly from the interior wall of container 11. Strainer-basket 12 includes circumferentially alternating undulating outwardly 12d and inwardly extending 12g circular planar sections that when rotated outward sections engage with pins 11c to support strainer-basket 12 above cooking liquid for staining of food. As indicated in dotted lines on FIG. 2 the bottom 12h of strainer-basket 12 may be concave upward into strainer-basket 12 to help eliminate water surface tension.

Lower portion 12a of strainer-basket 12 includes selectively placed apertures 12c, and circumferentially alternating undulating outwardly 12d and inwardly 12g extending circular planar sections. Outwardly extending sections 12d are generally circular planar and extend generally perpendicularly outwardly from the exterior wall of strainer-basket lower section 12a. Outward planar sections 12d are selectively spaced intermittently around the exterior lower section of strainer-basket 12a. Inwardly extending sections 12g are generally circular planar and extend generally perpendicularly inward for the exterior wall of strainer-basket lower section 12a. Upper portion 12b includes a circumferentially configured outwardly extending upper portion 12e. Upper portion includes two handles 12f (one handle for smaller version). Lid 13 includes top handle 13a. Strainer-basket 12 may be rotated within container 11 such that inwardly extending circular planar sections 12g do not overlay pins 11c but disengage to form an opening for strainer-basket 12 to pass into the cooking liquid. Conversely, strainer-basket 12 may be rotated within container 11 such that outwardly extending circular planar sections 12d sufficiently overlay pins 11c to restrict the opening to prevent passage of strainer-basket 12 and thus provide support for draining of strainer-basket 12.

Figure 2:
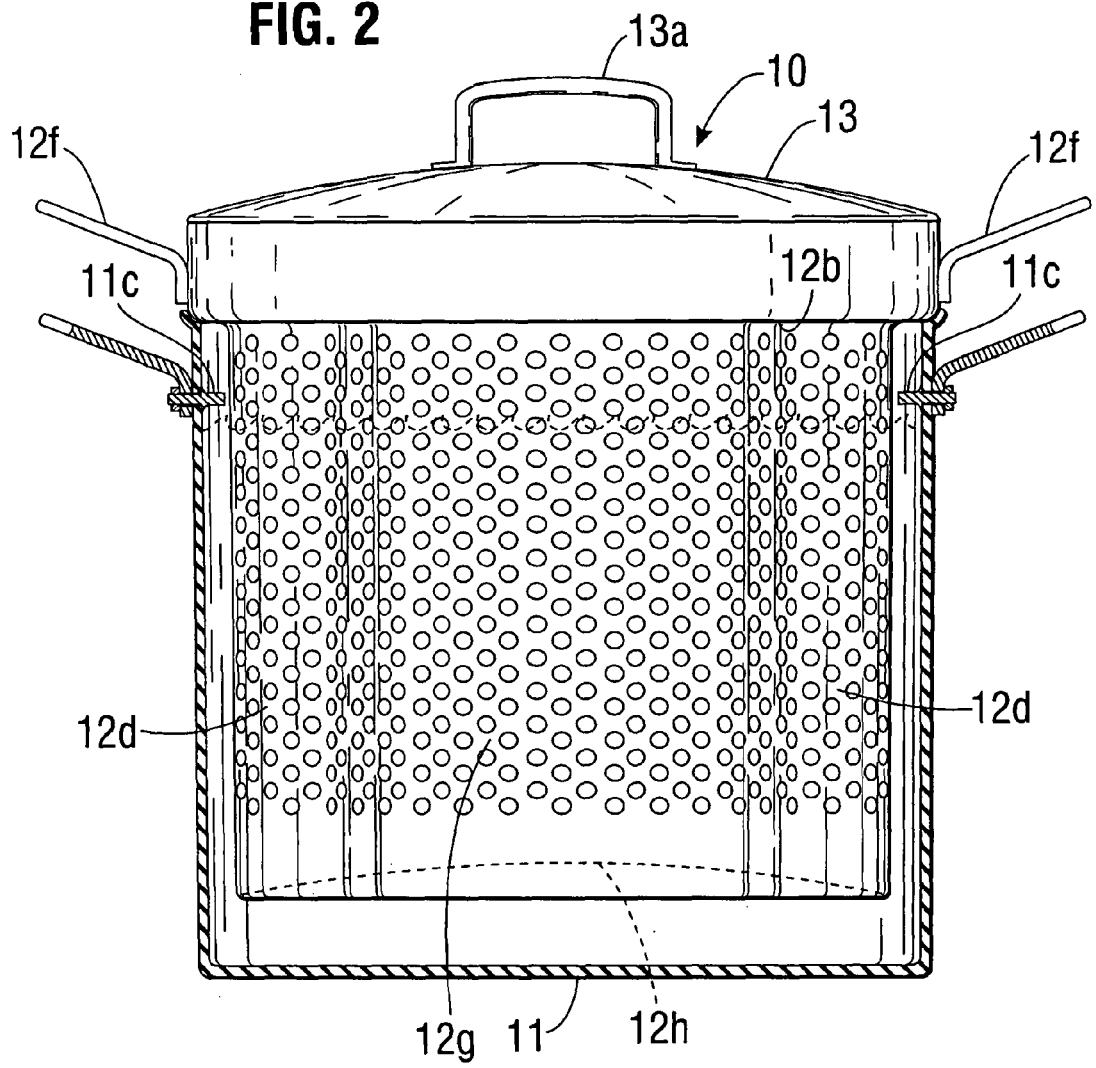
FIG. 2 illustrates in cross-sectional view the cooking strainer-basket of FIG. 1 submerged in the liquid for cooking of food.

FIG. 2 illustrates in cross-sectional view the cooking-strainer basket 12 of FIG. 1 submerged in liquid such as water (indicated by wavy lines) for cooking of food. The generally cylindrical support pins 11c of container 11 and inward circular section 12g of strainer-basket 12 have been disengaged permitting the lower portion 12a of strainer-basket 12 to be inserted into container 11 until upper portion 12b is sitting within lip 11b of container 11. In this position the food strainer-basket 12 is submerged for cooking. In this figure it is more clearly seen, in dotted lines, how the bottom 12h may be concave upward within strainer-basket 12 to help in eliminating water surface tension. It is to be understood that the position of the strainer-basket bottom 12h, liquid level within the container 11, depth of the strainer-basket 12, and the location of the container 11 and strainer-basket 12 support pins 11c and alternating planar sections 12d and 12g, respectively may be varied within the scope of the invention.

FIG. 3 illustrates a cross sectional view of one configuration of the generally cylindrical support pins of container 11 that support the outwardly extending planar sections 12g of strainer-basket 12. In this Figure it is also shown how the handle 11a may be made so that the support pin 11c may also support the handle 11a.

FIG. 4 shows strainer-basket 12 positioned in the food straining position above the liquid in container 11. As indicated by the arrows 5, strainer-basket 12 has been rotated into position so that the outwardly extending circular planar section 12d overlay the support pins 11c on container 11. That is, outwardly extending circular planar sections 12d are rotated into a position to overlay pins 11c, so as to restrict the opening to thereby prevent passage of strainer-basket 12, and thus provide support for draining of strainer-basket 12.

FIG. 5 is a top view showing the positioning of the outwardly extending circular planar support section 12g of strainer-basket 12 above the pins 11c of container 11 allowing for the strainer-basket to be raised and supported at the food straining position within the container 11.

FIG. 6 illustrates the apparatus of the invention with the support pins 11c of container 11, and the inwardly extending circular planar sections 12g in the open position wherein strainer-basket 12 is fully inserted into container 11 until the upper portion 12b is sitting on lip 11b of container 11. In this manner the apparatus of the invention is closed for cooking, storage, and or transport.

FIG. 7 is a top view of the apparatus 10 of the invention with the lid 13 removed to show the open, or disengaged, positioning of the inwardly extending circular planar sections 12g of strainer-basket 12 and support pins 11c of container 11, thus allowing for strainer-basket 12 to be inserted fully into container 11. In this positioning the upper portion 12b is sitting within lip 11b of container 11.

While the principles of the invention have been described and illustrated in a single embodiment, it will be obvious to those skilled in the art that many modifications of structure, arrangement, proportions, materials, and components used in the practice of the invention can be particularly adapted for specific environments and operating requirements without departing from these principles.

What is claimed is:

1. A method for cooking and draining food, said method comprising the steps of:
   a) obtaining a food cooking system which comprises a container and a strainer-basket, wherein the container has a top opening, a floor, a side wall and an inner cavity within which liquid may be placed such that the liquid partially fills the inner cavity; wherein the strainer-basket has indented areas and is insertable through the top opening and into the inner cavity of the container; wherein support members on the container configured to engage at least one engagement surface on the strainer-basket, wherein the strainer-basket is initially insertable to a submersed position within the inner cavity such that a lower portion of the strainer-basket becomes submersed within liquid that partially fills the inner cavity; and wherein the strainer-basket is subsequently moveable from said submersed position to a draining position wherein the support members engage at least one corresponding support member engaging surface on the strainer-basket so as to support the entire strainer-basket above liquid that partially fills the inner cavity;
   b) partially filling the container with a cooking liquid;
   c) placing food in the strainer-basket;
   d) inserting the strainer-basket to the submersed position within the inner cavity of the container while the strainer-basket is in a first rotational orientation such that the indented areas are aligned with the support members, thereby allowing the strainer-basket to pass downwardly to the submersed position;
   e) heating the cooking liquid to cook the food; and
   f) lifting the strainer-basket from the submersed position to the draining position, partially rotating the strainer basket so that the indented areas are no longer aligned with the support member and then releasing the strainer-basket causing the strainer-basket to rest on the support members, thereby supporting the strainer-basket in the draining position and allowing the food to drain.

2. A method according to claim 1 wherein the container and strainer-basket are further configured such that, when the strainer-basket is inserted to the submersed position, the strainer-basket is supported so that a lower portion of the strainer-basket is submersed in liquid that partially fills the inner cavity of the container but the bottom of the strainer-basket remains a spaced distance above the floor of the container.

3. A method according to claim 1 wherein Step b comprises partially filling the container with water.

4. A method according to claim 1 wherein Step b comprises partially filling the container with oil.

5. A method according to claim 1 wherein the container has handles which are aligned with the support members.

6. A method according to claim 5 wherein, during performance of Steps d and e, the handles, support members and indentations are aligned with each other.

7. A method according to claim 5 wherein the support members additionally function to secure the handles to the container.

8. A method according to claim 2 wherein a lip is formed on the strainer-basket and wherein, Step d further comprises inserting the strainer-basket until the lip abuts against a top rim of the container, thereby causing the bottom of the strainer-basket to remain a spaced distance above the floor of the container.

9. A method according to claim 8 wherein the abutment of the lip against the rim of the container additionally functions to close the inner cavity of the container.

* * * * *